July 13, 1926.

T. NEWELL

AUTOMATIC CONVEYING SYSTEM

Filed Feb. 15, 1923

INVENTOR
Timothy Newell
Harry Bowen
ATTORNEY

July 13, 1926.

T. NEWELL 1,592,310

AUTOMATIC CONVEYING SYSTEM

Filed Feb. 15, 1923          8 Sheets-Sheet 4

INVENTOR
Timothy Newell
Harry Bowen
ATTORNEY

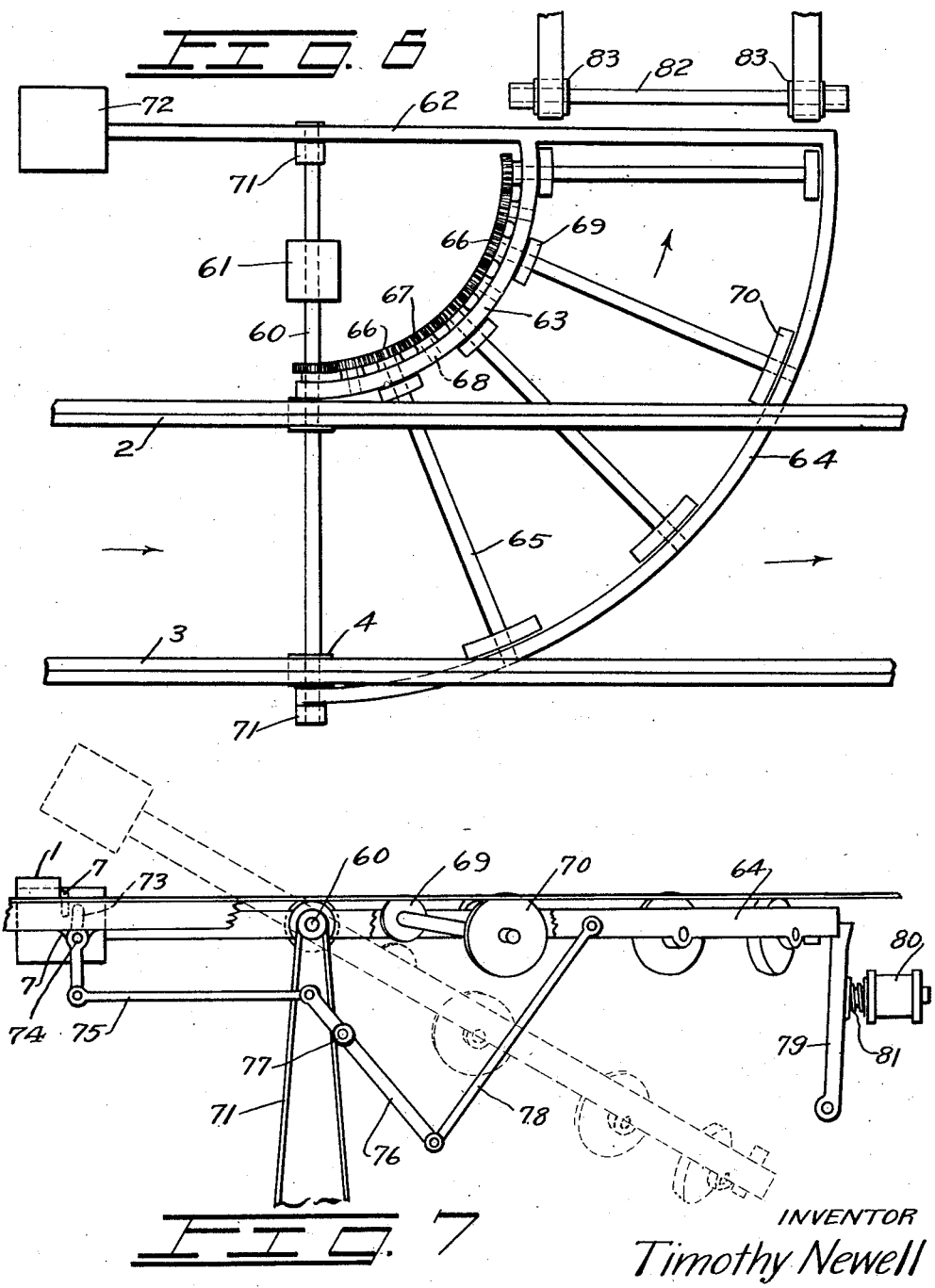

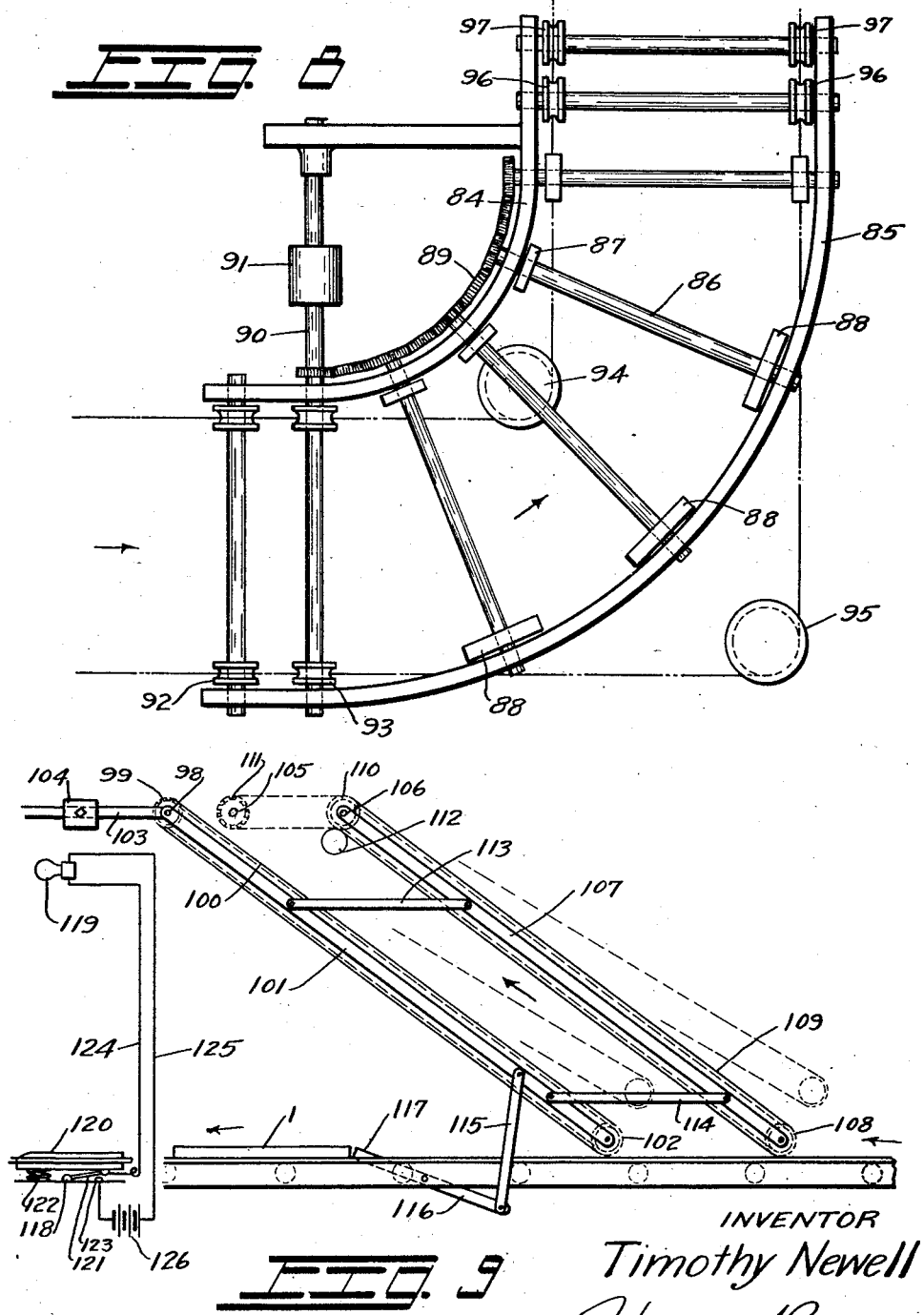

July 13, 1926.
T. NEWELL
1,592,310
AUTOMATIC CONVEYING SYSTEM
Filed Feb. 15, 1923
8 Sheets-Sheet 7
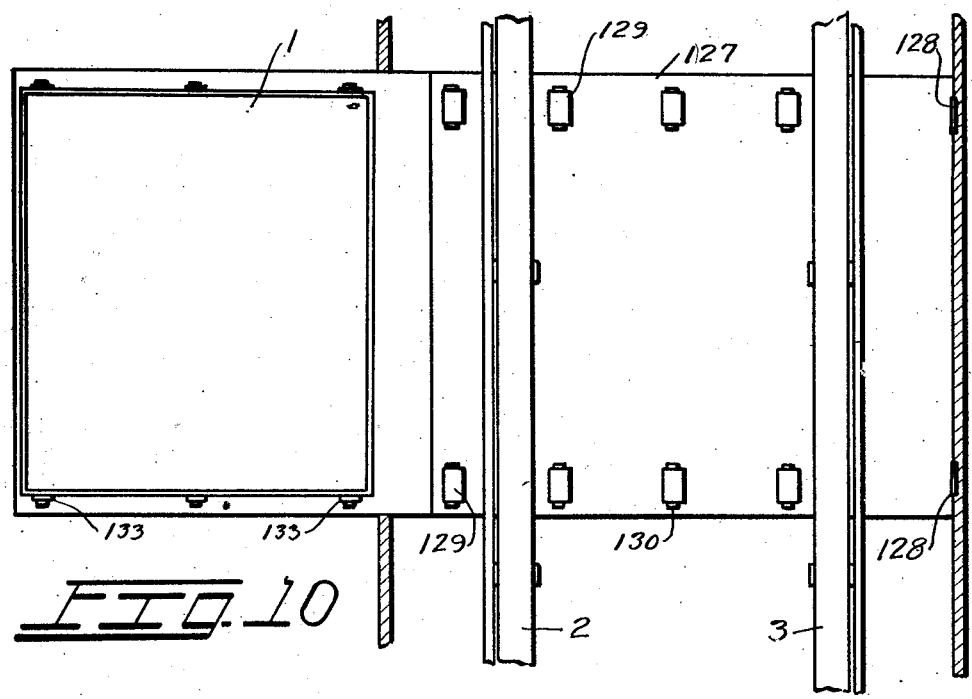
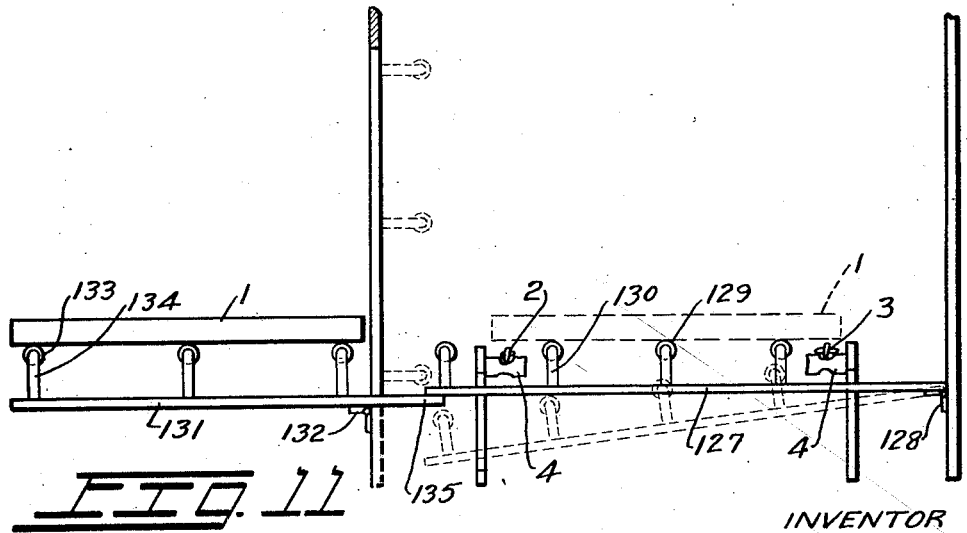
INVENTOR
Timothy Newell
Harry Bowen
ATTORNEY July 13, 1926.
T. NEWELL
1,592,310
AUTOMATIC CONVEYING SYSTEM
Filed Feb. 15, 1923
8 Sheets-Sheet 8
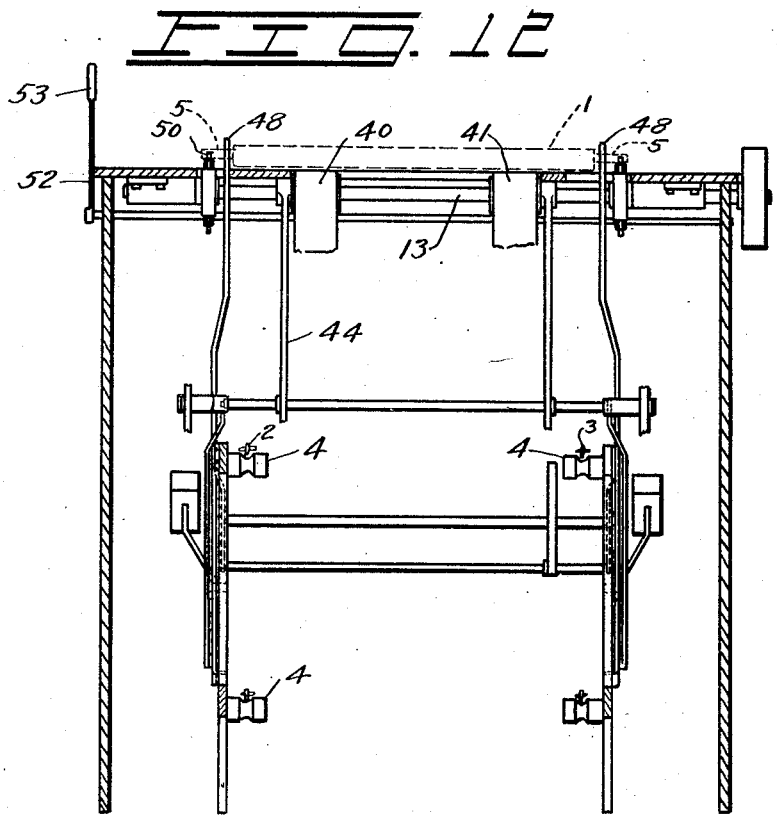
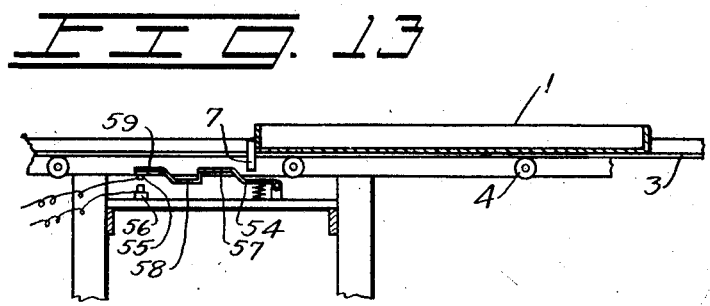
INVENTOR
Timothy Newell
Harry Bowen
ATTORNEY Patented July 13, 1926.

1,592,310

UNITED STATES PATENT OFFICE.

TIMOTHY NEWELL, OF YAKIMA, WASHINGTON.

AUTOMATIC CONVEYING SYSTEM.

Application filed February 15, 1923. Serial No. 619,237.

The invention is a conveying system through which various types of merchandise may be conveyed from a common point to their respective sections which may be in any desired positions from the starting point and through which the merchandise or the trays for carrying it may be returned to the starting point.

The object of the invention is to provide a conveyer which will handle merchandise of various types and designs in which the merchandise may be transferred to cross conveyers and from which the merchandise may be elevated to any desired number of floors.

Another object of the invention is to provide a conveyer which will carry trays upon which any desirable type or size of merchandise may be placed and which when elevating the trays will keep them horizontal.

And a further object of the invention is to provide switches for a conveyer by which trays on the conveyer may be picked up and carried to one side or raised.

And a still further object of the invention is to provide suitable projections on trays for a conveyer which will engage triggers and operate the switches.

With these ends in view the invention embodies a double chain conveyer in which the chains rest in idlers and in which are trays which ride upon the chains. The conveyer is provided with switches that are automatically operated by projections on the trays which engage triggers or levers that are connected to the switches and these switches pick the trays up from the main conveyer and carry them to one side or raise them to any desired height. The conveyers are also so constructed that they may bend around a corner with a very small radius and they are also provided with a means for feeding the trays back down on the conveyer from the elevated position.

Other features and advantages of the invention will appear from the following description taken in connection with drawings, wherein:—

Figure 6 is a plan view of a horizontal switch.

Figure 7 is a side elevation of the horizontal switch.

Figure 8 is a plan view of the corner.

Figure 9 is an elevation showing the inclined conveyer that drops trays on the main conveyer.

Figure 10 is a plan view of a door through which trays may be loaded and unloaded.

Figure 11 is a cross section showing the means for lifting the trays at the door.

Figure 12 is a cross section through the conveyer.

Figure 13 is a detail showing the means for operating the signals.

Figure 1:
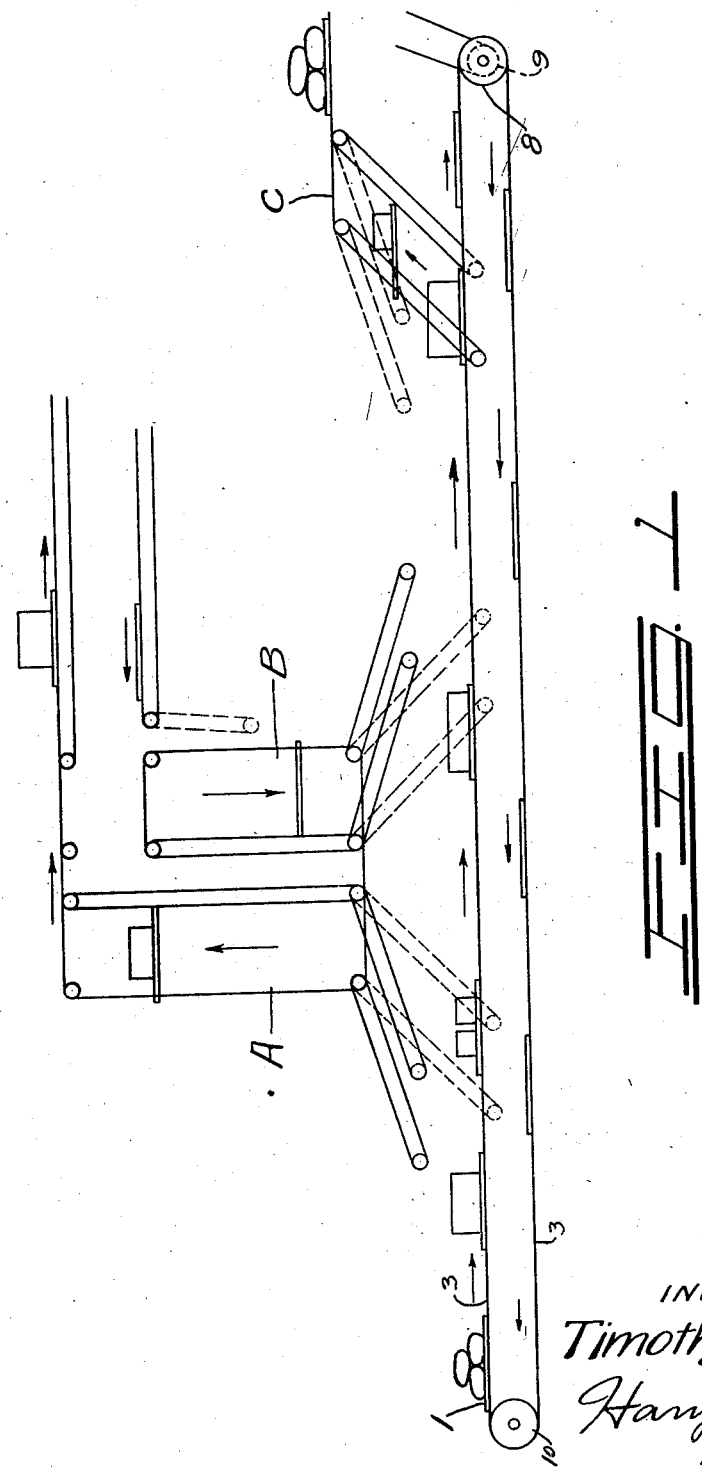
Figure 1 is a diagrammatic view showing a side elevation which shows the means for raising the trays from the conveyer and also for returning them to it.

In the drawings I have shown my conveyer as it would be arranged wherein numeral 1 indicates the trays, numerals 2 and 3 the conveyer chains, and numeral 4 the idlers.

Figure 2:
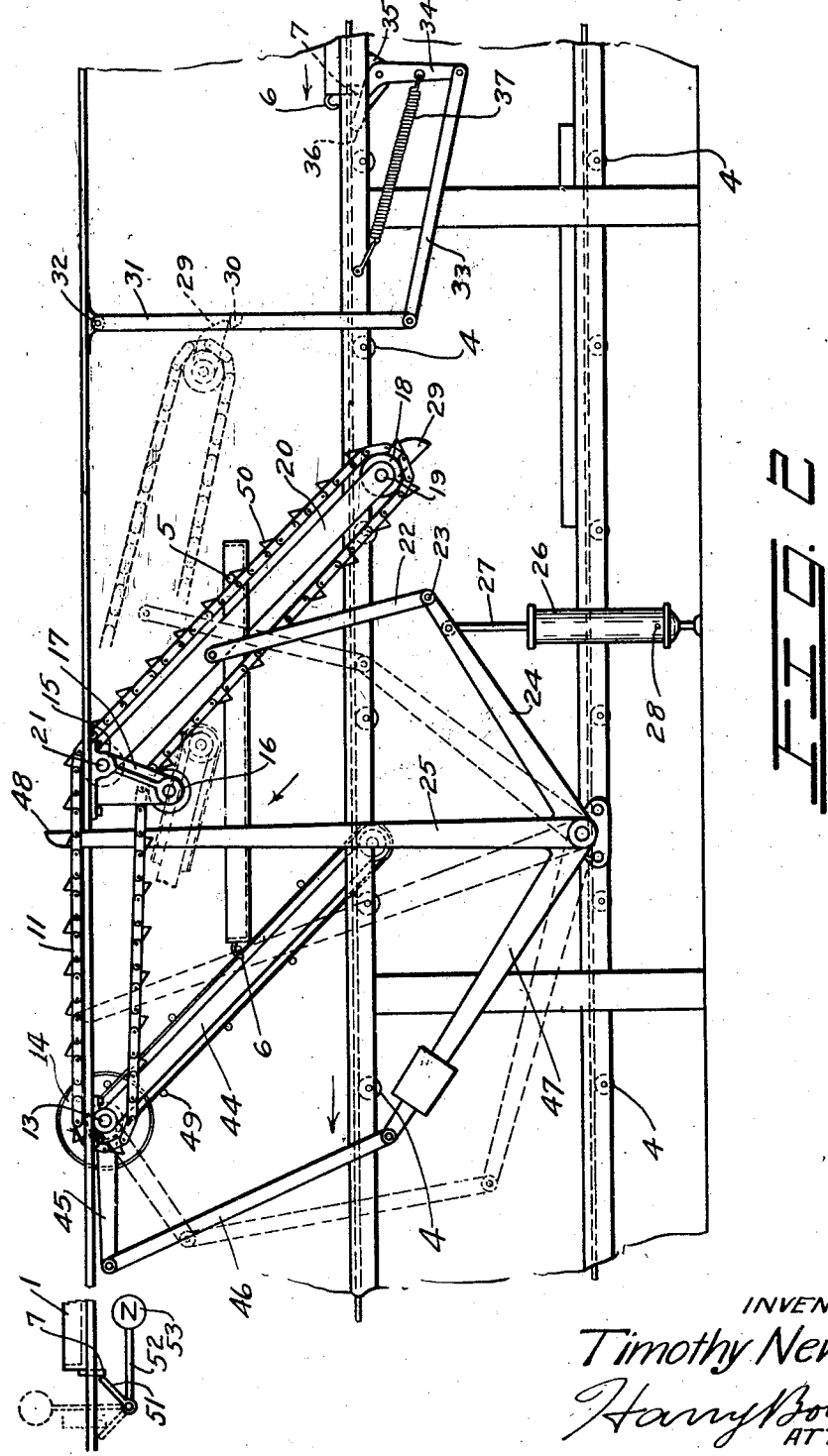
Figure 2 is a side elevation with parts broken away showing the switch for operating the inclined conveyer that automatically picks up trays from the main conveyer.

The trays may be constructed as shown in Figures 2 and 13 and may have lugs 5 on their sides adjacent the rear end by which they may be gripped when being carried up an incline, hooks 6 in the front ends which may hook over bars between the inner chains when traveling up a vertical conveyer, and projections 7 on their front ends which extend downward and engage the switch levers or signals. These projections may be so constructed that they may be readily adjusted to any desirable depth and may be moved to any desirable position across the front of the tray so that they may be set to operate any switch and so that they will only operate the switch for which they are set.

The main conveying elements 2 and 3 may be any desirable type of chain, belts, ropes or cables and may be of any suitable length or size. They will pass over a head pulley 8 at one end which may be driven by a pulley 9 from a counter-shaft or it is understood that the conveyer may be driven by an individual motor from any desirable means. A tail pulley 10 may be mounted in any suitable bracket which is provided with means for taking up the slack in the conveyer. The chains 2 and 3 rest upon idlers 4 which should be spaced continuously along the conveyer and the distance between them should be somewhat shorter than the length of the trays.

The switch shown in Figure 2 may be used to pick trays up off the conveyer and place them in a stationary position above the conveyer or may feed them onto a vertical elevator as shown in the first position which I have indicated by the letter A in Figure 1. This switch is constructed as shown with chains 11 and 12 on the sides of the conveyer which are driven from a shaft 13 which shaft may be driven by a pulley 14 or any suitable means. These chains then pass over the sprockets 15 and 16 in the brackets 17 and then downward to the sprockets 18 which are rotatably mounted on a shaft 19 and the shaft 19 is mounted in a movable bracket 20 that is pivotally mounted on the shaft 21 upon which are also the sprockets 15. The bracket 20 has an arm 22 pivotally connected to it and this arm is pivotally connected at the point 23 to an arm 24 of the lever 25. Below the arm 24 is a cylinder 26 the piston of which is connected to the arm 24 through the rod 27 and as this cylinder is provided with a very small hole 28 in its lower end for the air to pass out it will retard the downward motion of the arm 24. The bracket 20 will normally rest in the position shown in dotted lines in Fig. 2 with the projection 29 on its outer end engaging the lug 30 on a bar 31 which is pivotally attached to the frame at the point 32. The lower end of the bar is pivotally connected to another bar 33 and this bar is pivotally connected to a lever 34 which hangs from a bracket 35 on the frame and which has a projection 36 which projects upward under the path of the trays so that one of the projections 7 on the front of the trays may engage it. The lever 34 is held in the position shown by the spring 37 and when one of the projections 7 on the front of one of the trays strikes it it will engage the lever 36, move it downward and draw the bar 31 backward so that the projection 29 will drop off of the lug 30 and permit the chains 11 and 12 to drop downward to the position shown in full lines on the outside of the conveyer.

On the shaft 13 is also another pair of pulleys 38 and 39 over which belts 40 and 41 may pass and these belts also pass over pulleys 42 on a shaft 43 which is supported in a frame 44 that is pivotally mounted on the shaft 13 and this frame moves upward and downward in a similar manner to that of the frame 20 and is operated from the same lever through the arm 45, the bar 46 and the arm 47 of the lever 25; and as the tray moves up the incline the projections 5 on it will engage the upper ends 48 of the levers 25 and move them from the position shown in full lines to that shown in dotted lines in Figure 2. As the lever moves to the position shown in dotted lines the arms 24 and 47 will move with it to their respective positions which are shown in dotted lines and this movement will raise the frames 20 and 44 from the positions shown in full lines to those shown in dotted lines. It will be seen that only the trays set so that their projections 7 will engage the arm 36 will operate the switch and lower the inclined frames. It will also be seen that as the tray 1 moves forward the hooks 6 on its forward end will engage rods 49 on the belts 40 and 41 and the projections 5 will engage teeth 50 on the chains 11 and 12; and as both ends of the tray will be gripped at the same time the tray may be raised to any desired position and still remain horizontal. This means may also be used for raising trays from the main conveyer and feeding them to a vertical elevator as shown in the position A in Figure 1.

As the tray arrives at the end of the upper elevation shown in Figure 2 the projection 7 strikes a lever 51 which is connected to an arm 52 on the end of which is a signal 53 which may be of any suitable type; and as it moves forward it will move the lever from the position shown in full lines to that shown in dotted lines and this will move the signal 53 from the horizontal to the vertical position. It is understood that this signal may be of any desired color or may have any desired character on it or may have a light embodied in it so that it may call attention to any one in the vicinity and notify them that a tray has arrived at that point. It will be seen that this will be particularly useful for hotels or restaurants as the signal may be placed on the inside of the wall and a waiter or person in the room will be notified when the tray has arrived.

Figure 5:
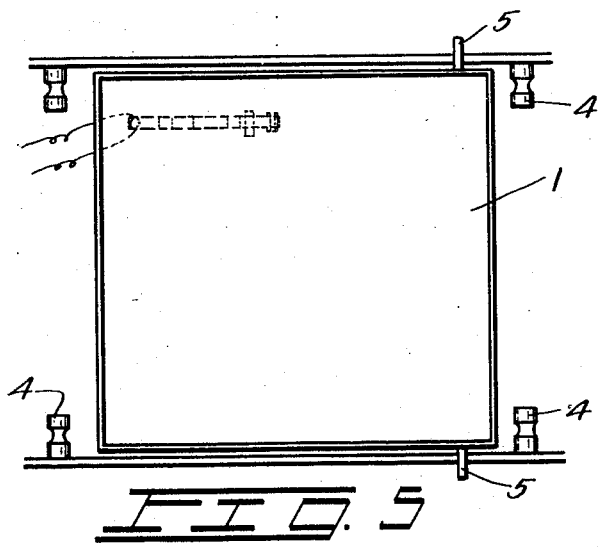
Figure 5 is a plan view of one of the trays.

In Figures 5 and 13 I have shown another type of signal with an electric contact that may light a light or ring a bell. In this design which is more clearly shown in Figure 13 the projection 7 may strike a contact bar 54 and force the contact point 55 against the point 56. It will be seen that as the projection 7 passes over the first raise 57 in the bar it will drop into the notch 58 at which time the contact will be broken and then as it engages the second raise 59 it will again make a contact so that a double signal may be given. It is understood that the bar 54 may be of any desired length and may have any desired number of raises and notches in it so that it will be possible to ring the bell any desired number of times; and it will also be seen that some of these raises may be long and some short so that it will be possible to obtain different combinations of long and short rings in order to get a large number of varied signals.

In Figs. 6 and 7 I have shown an elevation of a horizontal switch which may be pivotally mounted upon a shaft 60 which may also contain idlers 4 upon which the main conveyer chains 2 and 3 run. A pulley 61 may also be mounted on this shaft as shown in Figure 6 so that the shaft may be driven from a counter shaft or any desired means. The frame consists of a straight member 62 and two quadra-circular members 63 and 64 in which idler shafts 65 may be mounted; and on the inner end of these shafts are gears 66 which mesh with idler gears 67 and form a continuous train of gears which will drive the shafts 65. The idlers 67 are mounted on stub shafts 68 and these are rotatably mounted in the frame 63. On the inner ends of the shafts 65 and on the inside of the frame are rollers 69 and on the outer ends of these shafts are rollers 70 which are of a larger diameter than the rollers 69; as the frame is raised to the position shown in full lines in Figure 7 and a tray arrives at this position it will travel around the corner on the rollers 69 and 70. As the rollers 70 have a larger diameter than the rollers 69 their circumferential speeds will be greater and therefore the outside of the tray will move faster than the inside so that they will readily turn the corner. This frame may be pivotally supported in stands 71 and may have a counter weight 72 on the opposite side of the stand to assist in raising it.

The switch frame shown in Figures 6 and 7 normally rests in the position shown in dotted lines and when a tray arrives at the position shown one of the projections 7 on it will engage the upper end of a lever 73 which is pivoted in a bearing 74 on the lower side of the conveyer frame. A bar 75 is pivotally attached to the lower end of the lever 73 and the opposite end of the bar is connected to a lever 76 that is pivotally mounted in a bearing 77 on a frame. The opposite end of the lever 76 is connected to a lever 78 and this is connected to the side 64 of the switch frame. It will be seen that as the lever 73 is moved forward from the position shown in dotted line to the position shown in full line the switch frame will move from the position shown in dotted line to that shown in full lines; and when it arrives in this position it will be locked by a latch 79 as shown in Figure 7. It will remain in this position until the tray has passed over the switch and on to an auxiliary conveyer in which is a switch similar to that shown in Figure 9 which will close a circuit and operate the solenoid 80 which will draw the lever 79 away from the frame and permit the frame to drop to the dotted position. Between the solenoid and the lever is a spring 81 which will hold the lever against the frame and allow it to move toward the solenoid as the frame moves upward.

At the far side of the switch is a shaft 82 which may be the tail shaft of the auxiliary conveyer and may have pulleys or sheaves 83 on it over which the chains of the conveyer may pass. This conveyer may be constructed similar to the main conveyer and may be driven from it or by any suitable means.

In Figure 8 I have shown a view similar to that shown in Figure 6 which illustrates a turn or corner in the main conveyer. It will be seen that the frame is similar to the frame of the switch except that it is stationary. The frame is constructed of two quadra-circular members 84 and 85 which have shafts 86 between them similar to the shafts 65 and on these shafts are small rollers 87 and large rollers 88 which carry the trays around the corner. The shafts are driven by a train of gears 89 from a shaft 90 which may be driven from a counter shaft by a pulley 91 or from the main conveyer. It will be seen that the main conveyer chains pass over the pulleys 92 and under pulleys 93 so that they will be under the frame. They then pass around horizontal pulleys 94 and 95 and then under the pulleys 96 and over the pulleys 97 after which they will be in the same elevation as those of the main conveyer. It will be seen that as the trays arrive at this point the large rollers will move the outside of the trays faster than the inside so that they will travel around the curve and onto the chains of the main conveyer.

In Figure 9 I have shown a detail of an inclined portion of the conveyer by which trays may be lowered to the main conveyer. At the upper end is a shaft 98 upon which are pulleys 99 upon which the chains 100 which form the inner element of the conveyer, which element is similar to that hereinbefore described and shown in Figure 2 and which is supported in the frame 44. A frame 101 is also mounted upon the shaft 98 and this frame has pulleys 102 on its lower end over which the chains 100 also pass. At the upper end of this frame is a projection 103 upon which is a counter weight 104 which holds the frame in the position shown in dotted lines until a tray starts down the incline at which time the weight of the tray causes the frame to move downward to the position shown in full lines.

Figure 3:
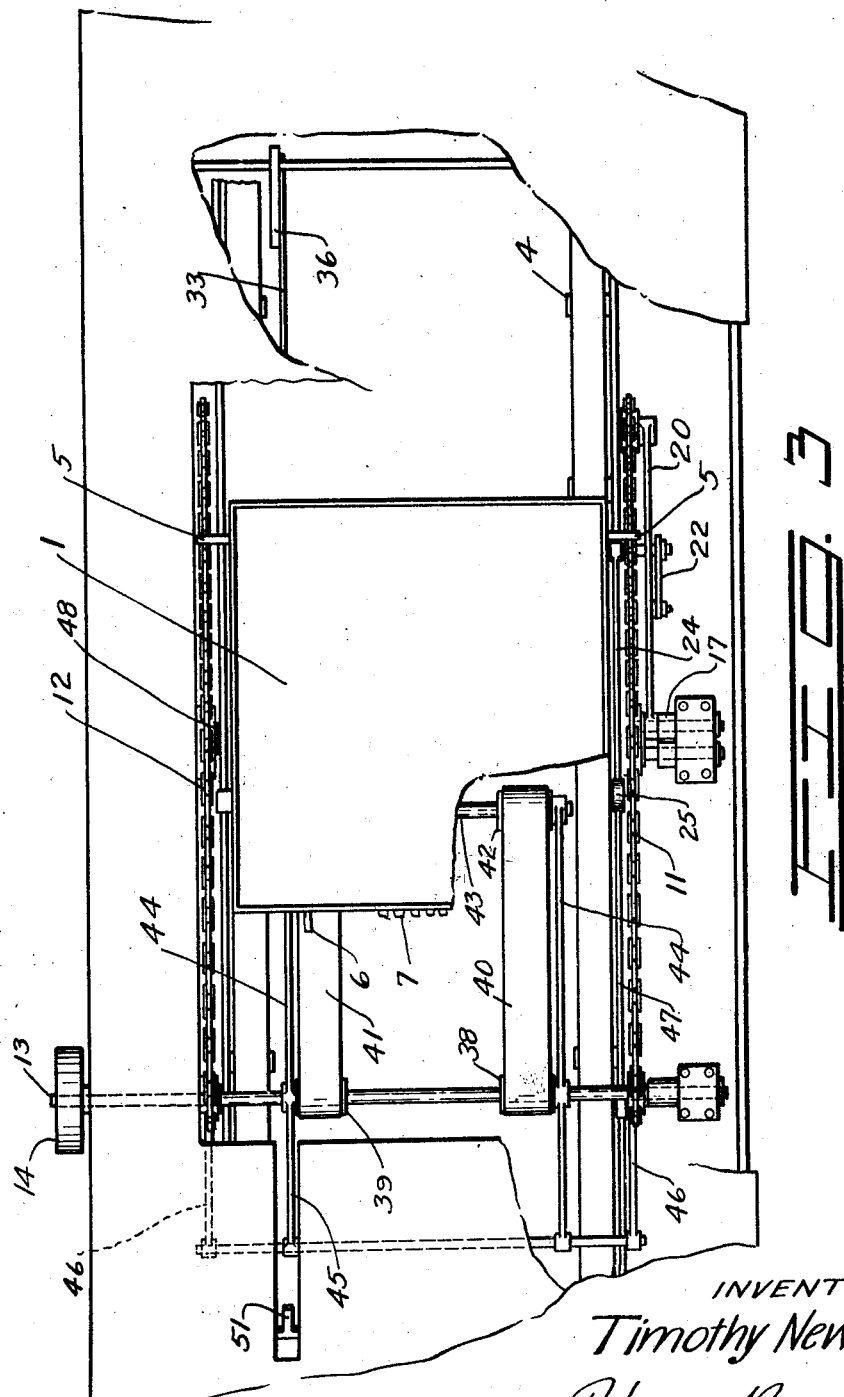
Figure 3 is a plan view of the switch shown in Figure 2.

In front of the shaft 98 is another shaft 105 and in front of this shaft is another shaft 106 which forms the upper end of another inclined section which is similar to the section in the frame 101. Another frame 107 is rotatably mounted on the shaft 106 and has pulleys 108 in its lower end over which are chains 109 and these chains also pass over pulleys 110 on the shaft 106 and pulleys 111 on the shaft 105 and are held upward by idlers 112. The chains on this section are on the outside of the conveyer and will engage the projections 5 on the sides of the trays as shown in Fig. 3 as they are carrying the trays downward. This section is attached to the forward section through the bars 113 and 114 so that it will be raised and lowered with it.

A bar 115 is pivotally attached to the frame 101 and also to a bar 116 which is pivoted in the conveyer frame in such a manner that as the frame 101 moves downward the free end 117 of the bar 116 will move upward to the position shown and stop a tray on the main conveyer. It will be seen that this will prevent a tray coming down the incline from landing on top of another tray of the main conveyer. As soon as the tray passes off from the incline the incline will rise to the position shown in dotted lines and the ends 117 will move downward so that the tray that has been stopped by them may move forward and pass under the inclined portion of the conveyer.

An electric switch 118 may be placed in the main conveyer at any convenient point before the inclined portion so that as a tray passes over it it will light a lamp 119 that may be placed at the upper end of the incline so that an operator at the upper end of the incline may know when a tray on the main conveyer is approaching the incline. This switch may be constructed with a bar 120 which has a member 121 pivotally attached to it and to the frame and also a spring 122 under it for holding it in the upper position. Below the contact point 121 is another contact point 123 through which a circuit may be completed as a tray passes over the bar 120. These points may be connected through the wires 124 and 125 and a battery 126 to the lamp 119, or to any desired type of signal which may be adjacent the upper end of the conveyer; and it will be seen that as the circuit is completed the lamp or signal will be lighted or operated.

In Figures 10 and 11 I have shown a door or opening in the side of a passage in which the conveyer may be installed through which a tray may be taken from the conveyer and loaded or unloaded. At this point is also a platform 127 which is hinged at the point 128 to the side of the passage and on which are rollers 129 which are held in the stands 130. The door 131 which is hinged at the point 132 has rollers 133 and stands 134 on it similar to the rollers and stands 129 and 130. The inner end of the door 135 projects inward and as it moves upward engages the end of the platform 127 and raises it from the position shown in dotted lines to that shown in full lines so that when the door is open the rollers 129 will stop a tray on the main conveyer and the tray may be rolled along the rollers to the position shown in full lines in Figure 11. In this position a tray may be loaded or unloaded and then rolled back into the passage to the position shown in dotted lines. The door may then be closed and the platform 127 will move downward to the position shown in dotted lines and the tray will then be free to move along the main conveyer.

Any suitable signal may be used to inform a person outside of the door of the passage that a tray containing objects for them is approaching the door. The signal shown in Figure 13 is preferable as by it any desired combination of short or long rings may be obtained. The same switch may also be used to light lamps which may be of different colors if desired.

At the point A shown in Figure 1 I have shown a vertical elevator to which trays may be fed by an inclined section as described and shown in Figures 2 and 3. It will be seen that as the trays arrive at the lower end of the vertical section the hooks 6 will engage bars on the rear chains which are similar to the bars 49 on the inner section in the frame 44 shown in Figure 2.

At the same time the projections 5 on the sides of the trays will engage lugs on the outer chains which are similar to the lugs 50 shown in Figure 2 and the trays will then be raised to the top of the elevator. They will then be moved in the direction of the arrow at the top of the elevator by the lugs until they rest upon another horizontal conveyer which may be similar to the main conveyer. After the merchandise has been removed from the trays the empty trays may be placed on another conveyer and returned to another vertical elevator B which will run in a direction opposite to that of the elevator A so that the trays will move downward in it. When they arrive at the lower end they may pass down an incline similar to that shown in Figure 9 which will feed them back to the main conveyer as hereinbefore described. At position C I have shown an incline similar to that shown in Figures 2 and 3 which may also be used to raise trays of merchandise from the main conveyer to another horizontal conveyer above. This incline may be of any desired length and may be made in sections so that it may convey trays of material from one floor to another.

It will be understood that changes may be made in the construction without departing from the spirit of the invention. One of which changes may be in the design of the trays as it is understood these may be of any suitable design with round or square corners and plain, or with ridges around them. Another may be in the means for operating the switches as it is understood these may be operated by any suitable mechanical or electrical means. And still another change may be in the arrangement, as it is understood that any desired combination of the conveyers, elevators or switches may be used.

The construction will be readily understood from the foregoing description. To use the conveyer it may be installed as shown or in any desired combination of the different parts and it will be seen that as the tray is placed on one end of the conveyer it will move along the conveyer to the opposite end unless it is picked up by some of the inclined sections or switches. As the merchandise is removed from the tray the tray may be placed on the lower side of the conveyer as shown in Figure 1 and it will be returned to the starting point. As a tray is started on the conveyer one of the projections 7 may be set so that it will engage the lever operating the switch of the section to which it is desired to convey the merchandise. It will be seen that the operating levers of the switches may be set in different positions and the projections 7 on the front of the trays may be set so that they will engage the lever of any desired switch.

Figure 4:
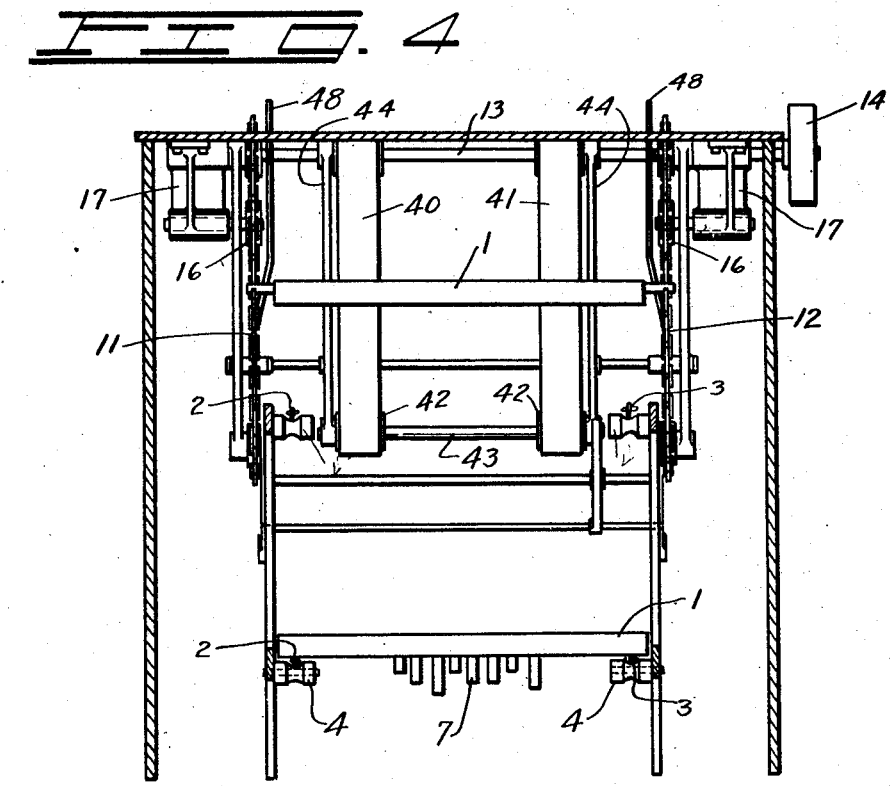
Figure 4 is a cross section through the switch shown in Figure 2.

These projections 7 may be so constructed that they may be regulated laterally or perpendicularly as shown in Figure 4 so that it will be possible to have a large number of different kinds of merchandise traveling on the conveyer at the same time and each kind will go to a different destination. It will also been seen that these trays may move upward or downward or to either side as far as may be desired.

A return conveyer traveling in the opposite direction of the main conveyer may be installed at one side of the main conveyer upon which merchandise may be returned to the starting point and another vertical elevator may be installed beside the elevator A which may be used to return trays of merchandise or empty trays to the lower elevation as down into the hold of a ship. This arrangement may be preferable to that shown in Figure 1 which shows one elevator behind the other.

Having thus fully described the invention what I claim as new and desire to secure by Letters Patent, is:—

1. A conveying system embodying a continuous double strand conveyer; a suitable frame having rollers in it to support the strands of the conveyer; trays that may be placed upon the strands having hooks on their forward ends, projections extending downward from their forward ends, and projections extending outward from their sides at their rear ends; quadra-circular frames having small rollers on their inside and large rollers on their outside which are pivotally mounted under the conveyer; levers for raising the quadra-circular frames that may be operated by the projections on the front of the trays; a latch for holding the frames in the upper position; a solenoid which is operated by an electric switch for releasing the latch; inclined portions of the conveyer above the main conveyer, said portions having their forward elements inside of the main conveyer and their rear elements outside of the main conveyer; suitable levers for raising and lowering the inclined section which may be operated from the projections on the front of the trays; a vertical elevator having its rear elements inside of the main conveyer and its forward elements outside of the main conveyer similar to the arrangement of the conveying elements in the inclined conveyer, so that trays being elevated will be suspended from four points, two of which are by hooks on the front of the trays which engage rods across the rear elements and the other two of which are projections from the sides of the rear of the trays which engage lugs on the forward elements; and an inclined section having conveying elements inside of the main conveyer, and other elements outside of the main conveyer similar to the former inclined section, said latter section moving in such a direction that trays will move downward, having counterweights for raising it above the main conveyer and a latch for stopping trays on the main conveyer while it is delivering trays to the main conveyer.

2. A conveyer having double continuous strands with rollers under them; switches automatically operated by projections on trays on the conveyer which will pick certain trays off of the conveyer and place them on auxiliary conveyers; inclined conveyer sections above the main conveyer which normally rest above the conveyer and which are operated by projections on trays on the conveyer so that they will move downward and pick up trays from the conveyer; vertical sections in which trays may be carried, said sections having four strands so that the trays will be supported from four points; other inclined sections by which trays may be returned to the main conveyer; a means for stopping trays on the main conveyer while the inclined section is delivering trays to it; a hinged platform having rollers on it which may be raised and lowered by opening and closing a door in the side of the conveyer casing, said platform being so constructed that the rollers on it will rise above the level of the conveyer and pick trays off from it as the door is opened and replace them on it as the door is closed; and signals operated by the trays as they pass along the conveyer.

3. A continuous double chain conveyer having rollers under the chains; switches for removing trays off from the main conveyer, said switches being operated by projections on the trays; inclined sections for elevating trays from the conveyer, said sections being also operated by projections on the trays, other inclined sections with the direction of the chains reversed for returning trays to the conveyer; signals in the conveyer which are also operated by projections on the trays; and openings in the conveyer casing which are provided with means for raising trays off of the conveyer and returning them to it; and said conveyer having turns in it which are constructed with sections containing rollers, the outside rollers of which are of a larger diameter than the inside and said turns having suitable means for lowering the conveyer chains before the turn and for raising them after the turn and said chains being so constructed that they may pass around vertical pulleys in the turn.

4. A conveying system embodying a horizontal conveyer having continuous double chains; a vertical conveyer having four chains passing upward, the rear chains having rods between them and the forward chains having lugs on them; inclined conveyers for raising trays from the main conveyer, delivering them to the vertical conveyer or stationary points and for returning the trays to the main conveyer; said inclined conveyers being constructed so that they may be raised above the main conveyer or brought into engagement with it by automatic switches operated by projections on the trays; switches for removing trays from the main conveyer embodying rollers of different diameters which are arranged so that as the switches are brought into engagement with the main conveyer the trays will move off of the main conveyer and on to an auxiliary conveyer, said switches being operated by projections on the trays; and said conveyer having turns in it in which are rollers of different diameters that are arranged so that as trays engage them they will pass around the corner and be placed on the chains of another conveyer.

TIMOTHY NEWELL.